Sept. 18, 1962 C. S. BACON 3,054,282
VEHICLE DOOR LOCK SAFETY DEVICE
Filed March 19, 1956
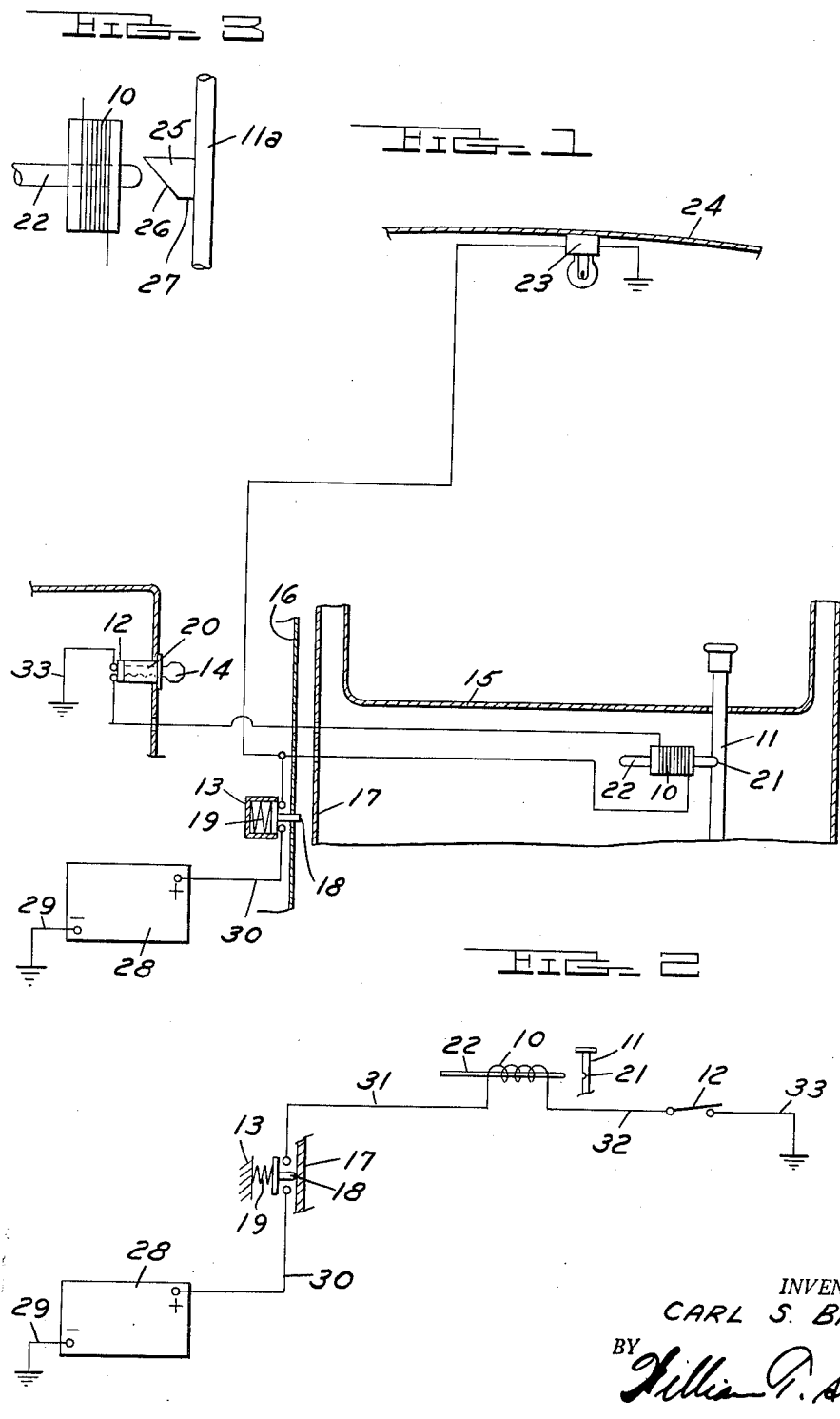
INVENTOR.
CARL S. BACON
BY
ATTORNEY

United States Patent Office 3,054,282
Patented Sept. 18, 1962

3,054,282
VEHICLE DOOR LOCK SAFETY DEVICE
Carl S. Bacon, 808 Owego Drive, Pontiac, Mich.
Filed Mar. 19, 1956, Ser. No. 572,434
7 Claims. (Cl. 70—264)

This invention relates to automotive door lock mechanisms and more particularly pertains to a safety device for an automobile door lock which prevents the operator from locking the car door when his keys are in the ignition.

Safety devices and systems for preventing a driver from locking his keys in the vehicle have been developed heretofore; however, the several devices of the prior art have not proven satisfactory inasmuch as they are complicated in design and construction, expensive to manufacture, difficult to use, unsatisfactory in performance, and usually interfere with the inside locking of the door so that the vehicle cannot be driven while in a door locked condition.

With the foregoing in view, the primary object of the invention is to provide a device which prohibits a driver from locking the vehicle doors from the outside while the vehicle keys are in the ignition switch which is simple in design and construction, inexpensive to manufacture, easy to integrate in a vehicle, easy to use, easy to operate, and which does not interfere with locking the vehicle doors from the inside while driving the vehicle.

An object of the invention is to provide a stop means on the inside operating lever plunger or lift arm of the vehicle door lock which co-operates with a solenoid which, when energized, contacts the lock arm so as to prevent the lock from being locked.

An object of the invention is to provide a circuit including the ignition key operated switch so that the solenoid is energized to prevent locking when the ignition key is in the ignition switch in either the "on" or "off" position.

An object of the invention is to provide a door operated switch adapted to be closed when the door is open with the door switch in series with the ignition key switch and the solenoid so that the solenoid can only be energized to block operation when both the vehicle door is open and the key is in the ignition switch.

An object of the invention is to provide a cam in association with the door lock arm and the solenoid which is adapted to move the lock arm in the event that the lock arm is in a locked condition upon opening the door.

An object of the invention is to provide a circuit requiring a minimum amount of wire and additional equipment to the equipment already found in a vehicle.

An object of the invention is to provide a device of the class described which can be manufactured inexpensively as the component parts are easily made and the assembly of parts readily accomplished.

An object of the invention is to provide a device of the class described which can be operated with ease by the ordinary user and which is substantially incapable of misuse.

An object of the invention is to provide a simple device of the class described which can be fitted to all sizes of locks or vehicles without changes in the assembly or arrangement of parts.

These and other objects of the invention will become apparent by reference to the following description of a safety device adapted to prevent the driver from locking his keys in the vehicle embodying the invention taken in connection with the accompanying drawing in which:

FIG. 1 is a schematic view partly in cross-section of the device and circuits employed together with portions of a vehicle body.

FIG. 2 is a wiring diagram suitable for operating the invention; and

FIG. 3 is a fragmentary view of the lock arm and solenoid shown in conjunction with an unlocking cam.

Referring now to the drawing wherein like numerals refer to like and corresponding parts throughout the several views, the safety device for preventing the driver from locking his car doors while his keys are still in the ignition switch disclosed therein to illustrate the invention comprises a solenoid 10 adapted to contact the block movement of the locking arm 11 with the solenoid 10 connected in series with the key operated switch 12 and the door operated switch 13 so that the solenoid 10 is only energized when both the key 14 is in the switch 12 and when the door 15 is open so that the switch 13 is closed completing the circuit.

More particularly, the device comprises a door frame 16 which hingedly supports the door 15 so that the door frame 17 is adapted to contact the plunger 18 of the switch 13 upon closing so as to open the switch 13 as seen in FIG. 2 and to permit the switch 13 to close upon the door 15 being opened as the door frame 17 moves out of contact with the plunger 18 allowing the spring 19 to close the switch 13. The ignition switch 20 is adapted to be operated by the key 14 and contains the additional switch means 12 which are adapted to be closed by the insertion of the key 14 into the switch 20. It is to be particularly noted that the switch means 12 are in addition to the ignition switch means normally incorporated with the vehicle motor circuit.

The arm 11 is provided with a notch 21 and the solenoid 10 has an armature 22 adapted to enter the notch 21 when the arm 11 is in the elevated non-locking position so that when the solenoid is energized the armature 22 will enter the notch 21 thereby prohibiting the depressing of the arm 11 so that the lock cannot be locked thereby. The door operated switch 13 normally operates the dome light 23 mounted on the car body roof portion 24 and is employed in the instant invention without interference.

Referring to FIG. 3, it will be noted that the plunger or lever arm 11A is disposed adjacent the solenoid 10 and is equipped with a cam faced stop 25 contactable by the solenoid armature 22 so that if the arm 11A is in locking condition, upon the solenoid 10 being energized, the armature 22 contacts the sloping face 26 of the stop 25 and moves the arm 11A to an unlocked position and then contacts the bottom stop portion 27 of the stop 25 whereby it prevents a repeated movement of the arm 11A in a locking direction.

By way of describing the integration of the invention with a commercial automotive vehicle door lock device, it is well known that on General Motors cars that the same key operates the ignition switch and the door lock and that the door can be locked by depressing the arm 11 and then holding the outside handle portion in a depressed condition and closing the door. It is therefore obvious that the key can be left in the ignition and the door locked from the outside without the use of the key thereby locking the key on the inside of the car. The device is described in conjunction with such a lock but not by way of limitation due to the fact that other types of automobile door locks can be integrated with the inventive device so as to prevent locking the keys inside the vehicle.

The circuitry involved in the device includes the vehicle storage battery 28, a ground lead 29, a lead 30 to the switch 13, a lead 31 to the solenoid 10, a lead 32 to the key operated switch 12, and a ground lead 33 from the switch 12. The door operated switch 13, the solenoid 10, and the key operated switch 12 are in series with the result that only when both the door operated switch 13 is closed and the key operated switch 12 is closed is there any energy supplied to the solenoid 10 to move the armature 22 into contact with the stop 21 or cam stop 25.

In operation, in the event that the driver leaves the key 14 in the ignition switch 20, he normally opens the door 15 by operating the inside handle which automatically elevates the arm 11 into unlocked position and therefore necessitates his depressing same to lock the door 15 by then holding the plunger down on the outside door handle. When, however, he opens the door 15, leaving his key 14 in the ignition switch 20, the door frame portion 17 moves off the plunger 18 thereby allowing the switch 13 to close and since the key 14 remains in the ignition switch 20 the switch 12 is closed and the circuit including the solenoid 10 is energized moving the armature 22 into contact with the stop 21 thereby holding the arm 11 against movement to lock the door. The driver then is advised that his key is still in the car. Upon the driver removing his key from the switch 20, the circuit to the solenoid is broken by the switch 12 being open so that the driver can then depress the arm 11 and lock the door from the outside in the normal fashion.

Referring to FIG. 3, in the event no automatic elevation of the arm 11 is incorporated in the door lock in conjunction with the inside door handle, upon the door being opened with the arm 11 in a depressed locked position, the circuit including the solenoid 10 will be energized thereby moving the armature 22 into contact with the cam portion 26 of the stop 25 so as to move the arm 11A out of locked position whereupon the armature 22 will move under the stop 25 and abut the flat stop portion 27 thereon preventing a repetition of the downward movement of the arm 11A thereby preventing the door from being locked and advising the driver that his key is still in the ignition.

This invention device with the features described constitutes a compact, durable, easily operated, and very inexpensive mechanism for preventing a driver from inadvertently locking his keys in the ignition switch of a vehicle.

It is to be particularly noted that only the addition of the solenoid and the switch portion 12 of the ignition switch 20 are required to the elements already carried by the vehicle, thereby not adding much to the cost of the vehicle.

Although but a single embodiment of the invention has been shown and described in detail, it is obvious that many changes may be made in the size, shape, detail, and arrangements of the various elements of the invention in conjunction with other type automobile locks and modifications thereof within the scope of the appended claims.

I claim:

1. A vehicle door lock anti-locking device comprising a vehicle door, a lock on said door, an inside arm on said lock for placing the lock in locked condition, means on said arm constituting a stop, a solenoid on said door adapted to contact said arm stop to prevent said arm being moved to the locking position under certain conditions, an ignition switch, a key insertable in said switch, added switch means in said ignition switch adapted to close a circuit when said key is inserted; said added switch means and said solenoid being connected in series so that said solenoid is energized to contact said arm stop when said key is in said ignition switch, a switch adjacent said door adapted to close when said door is open disposed in series with said added switch means and said solenoid so that said solenoid is energized only when both said door is open and said key is in said ignition switch.

2. A vehicle door lock system for preventing locking the vehicle door when the key is in the ignition switch of the vehicle, comprising a vehicle door, a lock on said door lockable from the outside without use of a key, an arm on the lock for setting said lock so as to be lockable from outside the vehicle by first depressing said arm, an ignition switch having first ignition switch means, a key adapted to operate both said door lock and said ignition switch, a second switch means in said ignition switch adapted to close when said key is in said ignition switch, a door operated switch adapted to close a circuit when said door is open, means on said arm constituting a stop, a solenoid on said door adjacent said arm adapted to engage said arm stop when energized to prevent movement of said arm in a locking direction, a circuit having said ignition switch second switch means, said door operated switch, and said solenoid so that said solenoid is energized to block said arm only when the key is in said ignition switch and said door is open.

3. An electrical device for preventing a driver from inadvertently locking the doors of a vehicle with the key in the ignition switch comprising an ignition switch lock tumbler and key, a key operated switch adapted to close when said key is lying in the ignition switch lock tumbler, a vehicle having at least one door adapted to open and close, a door operated switch adapted to close when the door is open, an inside locking lever arm mounted on said door adapted to place said lock in locked and unlocked condition by movement in opposite directions from a position inside of said door, a solenoid on said door adjacent said arm having an armature adapted to contact said arm when said solenoid is energized, a stop on said arm adapted to be abutted by said solenoid to prevent said arm being moved in a lock locking direction, a circuit connecting said key operated switch, said door operated switch, and said solenoid in series so that said arm cannot be moved in a locking direction when said key is in said ignition switch when said door is open and so that said arm can be moved in a locking direction when said door is closed and said key is in said ignition switch.

4. An electrical device for preventing a driver from inadvertently locking the doors of a vehicle with the key in the ignition switch comprising an ignition switch lock tumbler and key, a key operated switch adapted to close when said key is lying in the ignition switch lock tumbler, a vehicle having at least one door adapted to open and close, a door operated switch adapted to close when the door is open, a lock on said door adapted to be operated by said ignition key from a position outside said door, an inside locking lever arm mounted on said door adapted to place said lock in locked and unlocked condition by movement in opposite directions from a position inside of said door, a solenoid on said door adjacent said arm having an armature adapted to contact said arm when said solenoid is energized, a stop on said arm adapted to be abutted by said solenoid to prevent said arm being moved in a lock locking direction, a circuit connecting said key operated switch, said door operated switch, and said solenoid in series so that said arm cannot be moved in a locking direction when said key is in said ignition switch when said door is open and so that said arm can be moved in a locking direction when said door is closed and said key is in said ignition switch.

5. An electrical device for preventing a driver from inadvertently locking the doors of a vehicle with the key in the ignition switch comprising an ignition switch lock tumbler and key, a key operated switch adapted to close when said key is lying in the ignition switch lock tumbler, a vehicle having at least one door adapted to open and close, a door operated switch adapted to close when the door is open, a lock on said door adapted to be operated by said ignition key from a position outside said door, an inside locking lever arm mounted on said door adapted to place said lock in locked and unlocked condition by movement in opposite directions from a position inside of said door, means on the outside of said door adapted to cooperate with said inside arm for locking said door without the use of said key, a solenoid on said door adjacent said arm having an armature adapted to contact said arm when said solenoid is energized, a stop on said arm adapted to be abutted by said solenoid to prevent said arm being moved in a lock locking direction, a circuit connecting said key operated switch, said door operated switch, and said solenoid in series so that said arm cannot be moved in a locking direction when said key is in said ignition switch when said door is open, and so that said arm can be moved in a locking direction when said door is closed and said key is in said ignition switch.

6. An electrical device for preventing a driver from inadvertently locking the doors of a vehicle with the key in the ignition switch comprising an ignition switch lock tumbler and key, a key operated switch adapted to close when said key is lying in the ignition switch lock tumbler, a vehicle having at least one door adapted to open and close, a door operated switch adapted to close when the door is open, an inside locking lever arm mounted on said door adapted to place said lock in locked and unlocked condition by movement in opposite directions from a position inside of said door, a solenoid on said door adjacent said arm having an armature adapted to contact said arm when said solenoid is energized, a stop on said arm adapted to be abutted by said solenoid to prevent said arm being moved in a lock locking direction, a circuit connecting said key operated switch, said door operated switch, and said solenoid in series so that said arm cannot be moved in a locking direction when said key is in said ignition switch when said door is open and so that said arm can be moved in a locking direction when said door is closed and said key is in said ignition switch; said arm stop having a cam face adapted to move said arm in a lock unlocking direction when contacted by said solenoid armature.

7. An electrical device for preventing a driver from inadvertently locking his vehicle with the key in the ignition switch comprising a vehicle, at least one door on said vehicle, a lock on said door, an inside arm on said lock for placing said lock in locked condition when said door is open or closed by movement in one direction and to unlock said lock by movement in the opposite direction, trip means on said lock for moving said arm to the unlocked position when said door is opened or closed, antitrip means on said lock operable from outside said door for permitting the driver to lock said door by moving said arm without the use of a key, a door lock key cylinder, an ignition lock key cylinder, a key adapted to operate both said cylinders, a stop on said arm, a solenoid on said door adjacent said arm having an armature adapted to engage said stop to prevent said arm being moved in a locking direction, a door operated switch adapted to close when said door is open, a key operated switch on said ignition cylinder adapted to close when said key is in said cylinder, and a circuit including said solenoid, said door operated switch, and said key operated switch in series so that said solenoid is only energized when both said switches are closed so that said door can be locked from the inside when closed as said door operated switch is open, but, so that when said arm is in the unlocked position when the door is open and said key is in said key operated switch, said solenoid is energized to move said armature into contact with said stop to prevent the driver from moving same into locked position while said key is still in the ignition cylinder.

References Cited in the file of this patent
UNITED STATES PATENTS

| | | |
|---|---|---|
| 2,006,624 | Block | July 2, 1935 |
| 2,105,350 | FitzGerald | Jan. 11, 1938 |
| 2,189,346 | Kamp | Feb. 6, 1940 |
| 2,339,170 | Jacobs | Jan. 11, 1944 |
| 2,459,029 | Ingres et al. | Jan. 11, 1949 |
| 2,613,258 | Azano | Oct. 7, 1952 |
| 2,802,357 | Smith | Aug. 13, 1957 |